US007996980B2

(12) United States Patent

Hillstrom et al.

(10) Patent No.: US 7,996,980 B2

(45) Date of Patent: Aug. 16, 2011

(54) SIGN STAND WITH ROLLING BASE

(75) Inventors: David U. Hillstrom, Novi, MI (US); Brian J. Hillstrom, Rockford, MN (US)

(73) Assignee: Marketing Displays, Inc., Farmington Hills, MI (US)

(*) Notice: Subject to any disclaimer, the term of this patent is extended or adjusted under 35 U.S.C. 154(b) by 0 days.

(21) Appl. No.: 12/554,653

(22) Filed: Sep. 4, 2009

(65) Prior Publication Data

US 2009/0320266 A1 Dec. 31, 2009

Related U.S. Application Data

(62) Division of application No. 10/904,982, filed on Dec. 8, 2004, now Pat. No. 7,584,563.

(51) Int. Cl.
*B23P 11/00* (2006.01)

(52) U.S. Cl. ................. 29/525.01; 248/346.2; 40/607.1; 40/606.02

(58) Field of Classification Search ............... 40/606.02, 40/607.1, 606; 29/428, 525.01; 248/346.2; 403/219, 335, 337
See application file for complete search history.

(56) References Cited

U.S. PATENT DOCUMENTS 3,646,696 A * 3/1972 Sarkisian ........................ 40/602
3,662,482 A * 5/1972 Sarkisian ........................ 40/602
4,288,053 A * 9/1981 Sarkisian ................... 248/218.4
4,548,379 A * 10/1985 Seely et al. ................... 248/624
5,003,748 A * 4/1991 Carr ................................ 52/693
5,220,740 A * 6/1993 Brault ........................ 40/606.02
5,248,140 A * 9/1993 Mower et al. ................. 473/484
5,875,518 A * 3/1999 Walker .............................. 15/46
5,878,518 A * 3/1999 Grewe ....................... 40/606.02
6,776,734 B2 * 8/2004 van Nimwegen ............. 473/481
7,140,581 B1 * 11/2006 White ........................... 248/129
2001/0035485 A1 * 11/2001 Davis et al. ................ 248/346.2
2003/0230692 A1 * 12/2003 Davis et al. ................ 248/346.2

* cited by examiner

*Primary Examiner* — David P Bryant

*Assistant Examiner* — Bayan Salone

(74) *Attorney, Agent, or Firm* — John A. Artz; Dickinson Wright PLLC

(57) ABSTRACT

A portable sign stand with wheels or rollers, an adjustable weighted base member, and a sign display member. The base member has one or more compartments so that liquid or solid ballast can be added to stabilize the sign stand in windy conditions. The upper and lower wall members of the otherwise hollow base member are joined together at one or more locations where the sign display member is connected to the base member. The base member can be made by blow molding techniques. Wheels are provided on one edge of the base member in order to allow the sign stand to be rolled and easily moved to different positions. Axle members secure the wheels to the base member. One or more resilient members can be used to connect the sign display member to the base member.

7 Claims, 5 Drawing Sheets

SIGN STAND WITH ROLLING BASE

CROSS-REFERENCE TO RELATED APPLICATIONS

The present invention is a divisional of U.S. application Ser. No. 10/904,982, filed Dec. 8, 2004 now U.S. Pat. No. 7,584,563.

TECHNICAL FIELD

The present invention relates to portable sign stands which have a rolling base.

BACKGROUND OF THE INVENTION

Signs and sign stands are used for a variety of different purposes today with virtually all types of businesses. For example, signs and sign stands of various types are used for point of purchase displays, either interior or exterior to the establishment. Signs and sign stands are also used by the traffic control and safety industry to provide notice and/or warnings to passing pedestrians and motorists.

Many of the sign stands in use today are spring-mounted wind-resistant sign stands. Some of these are shown, for example, in U.S. Pat. Nos. 3,646,696, 3,662,482, 4,288,053, and 4,548,379. There also are numerous sign stands, in use today which use T-shaped legs or weighted bases in order to keep them in place. Where weighted bases are used, it is often difficult to provide appropriate size and weight base in order to provide the best wind-resistance and yet, at the same time, allow the sign stands to be portable.

Some wind-resistant sign stands with portable bases which can be easily moved from location to location are disclosed, for example, in U.S. Pat. Nos. 5,875,578 and 5,878,518 as well as EP 1,120,771 A1.

It is an object of the present invention to provide an improved sign stand which has a weighted base and is readily portable. It is also an object of the present invention to have a portable sign stand which is easier and less expensive to manufacture than known portable sign stands.

It is a further object of the present invention to provide a portable sign stand which has a base member which is easier and less expensive to manufacture. It is still another object of the present invention to provide a portable sign stand which has fewer components than know portable sign stands and which is as durable and similar in performance.

These and other objects, and purposes of the present invention will become apparent from the following summary and descriptions of the invention.

SUMMARY OF THE INVENTION

The present invention provides a portable sign stand which is an improvement over known portable sign stands. The inventive sign stand has fewer components and is less expensive to manufacture than known portable sign stands and is comparable in performance and durability. The portable sign stand includes a base member and a display sign, and also preferably a resilient or biasing mechanism which allows the display sign to move or flex relative to the base member. The base member has one or more hollow cavities which can be filled with a ballast material, such as sand, water, or the like in order to render it more stable. The resilient biasing mechanism can include one or more spring members which allows the upright display sign to flex or deflect in windy conditions or if inadvertently struck by a person or vehicle.

The base member preferably comprises a hollow molded plastic member. This provides a relatively light-weight easy to move base member to which sand, water, or other ballast material can be added to stabilize it when and where desired. The base member has one area where the wall structure is increased in thickness in order to provide a stronger and more durable location for placement and attachment of the biasing mechanism and/or display sign.

In one embodiment, the top and bottom walls of the hollow base member are joined together in one or more places in order to provide the increased thickness. In order to provide portability of the sign stands, one or more wheel members are preferably provided in the base member. In one embodiment of the present invention, the wheel members are positioned on axles and snap-fitted in mating recesses in the base member.

These and other features, benefits and advantages of the present invention will become apparent from the following description of the invention, when viewed in accordance with the attached drawings and appended claims.

BEST MODE(S) OF THE INVENTION

Figure 1:
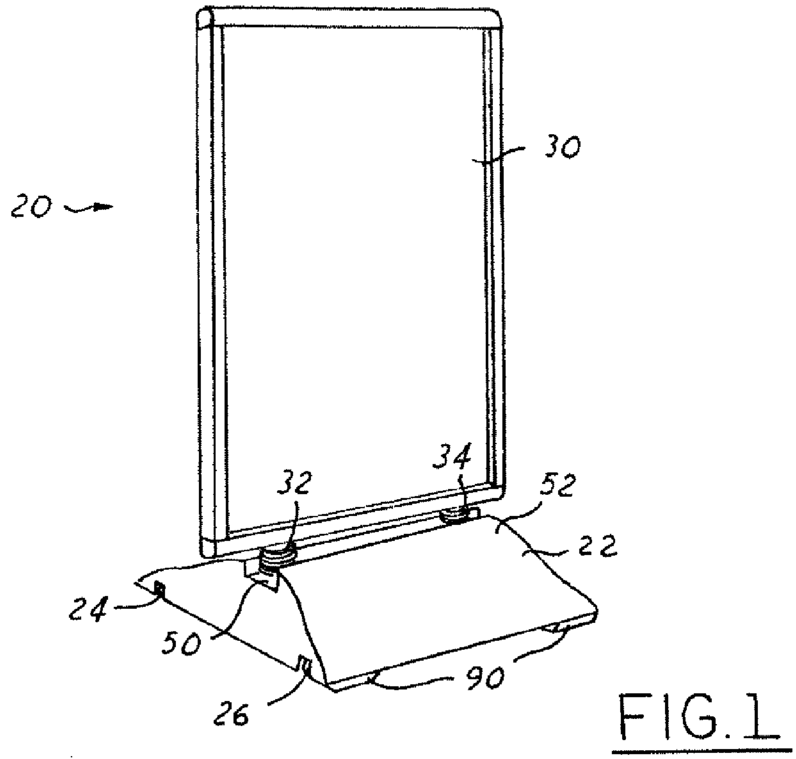
FIG. 1 illustrates one preferred embodiment of the present invention.

One embodiment of the present invention is referred to generally by the numeral 20 in FIG. 1. This embodiment comprises a sign and sign stand device having a base member 22 in which the weight can be adjusted and which has roller members 24, 26 in order to allow the sign stand to be easily moved from one position to another.

The sign stand device 20 includes a base member 22 and an upright sign display member 30. The sign display member 30 is connected to the base member 22 by a pair of coil spring members 32, 34. Although the invention is shown in the preferred embodiment utilizing a pair of coil spring members connecting the sign display member to the base member, it is also understood that the sign member can be connected to the base member in any conventional manner.

Preferably the sign display member is connected to the base member by a resilient mechanism in order to allow the sign display member to deflect or flex when subject to contact or wind forces. In this regard, the resilient mechanism could comprise one or more resilient members, such as flat spring members, torsion spring members, coil spring members, leaf spring members or the like. The resilient member could be made of a metal or composite material, or be made of a resilient plastic or elastomeric material.

The sign display member could also be attached or connected to the base member in a fixed manner which does not bend or flex. The sign display itself could be a rectangular upright member of the type shown in FIG. 1 and used to display messages, such as advertising or promotional messages. The sign display could also be a construction, road, or commercial sign of any size or shape, and be attached to one or more upright posts or support members.

Sign stands connected to base members with one or more spring members are disclosed, for example, in U.S. Pat. Nos. 3,646,696, 3,662,482, 4,288,053, 5875,578 and 5,878,518, the disclosures of which are hereby incorporated by reference. Sign stands of this type are sold under the trademark WINDMASTER™ by Marketing Displays, Inc., Farmington Hills, Mich.

The base member 22 is preferable molded from a plastic material, such as high density polyethylene, polypropylene, or the like, although other equivalent materials which could fulfill the purposes and objects of the present invention could be utilized. The inside of the base member has one or more compartments or hollow chambers 40, 42. One or more ports or openings 44 are utilized to communicate with the chambers so that they can be filled with a liquid or solid ballast material, such as water, sand, or the like.

The base member 22 is preferably molded in the size and configuration shown (in FIGS. 1-7) by blow molding techniques, although other molding techniques which can provide the same or comparable structure and benefits could be utilized. With blow molding processing of the plastic base member 22 in accordance with the present invention, the base members can be produced in substantially less time and with substantially less expense than plastic base members fabricated by other techniques, such as rotational molding techniques. With the preferred fabrication technique, openings or joints are unnecessary and the base can be provided without potential ballast leakage sites.

Also, in accordance with the preferred embodiments of the invention, the base member has only one or more inlet/outlet ports 44 for filling/emptying of the internal cavity or cavities 40, 42 and these ports can be readily sealed with an appropriate plug and situated at a position where leakage is not a concern. For example, member 46 of any conventional type, preferably made of plastic or an elastomeric/rubber material, can be provided to removably seal each of the ports or openings.

When it is desired to fill the chambers in the base member with ballast, the sign stand 20 is preferably tipped or positioned at an angle. In this manner, liquid such as water from a hose can be introduced into the hollow chambers through opening 44. Plug member 46 plugs the opening after the base member is filled with ballast.

When it is desired to empty the base member 22, the sign stand 20 can be tipped over or positioned upside down. This allows the liquid or solid ballast in the base member to flow out of ports or openings.

Figure 2:
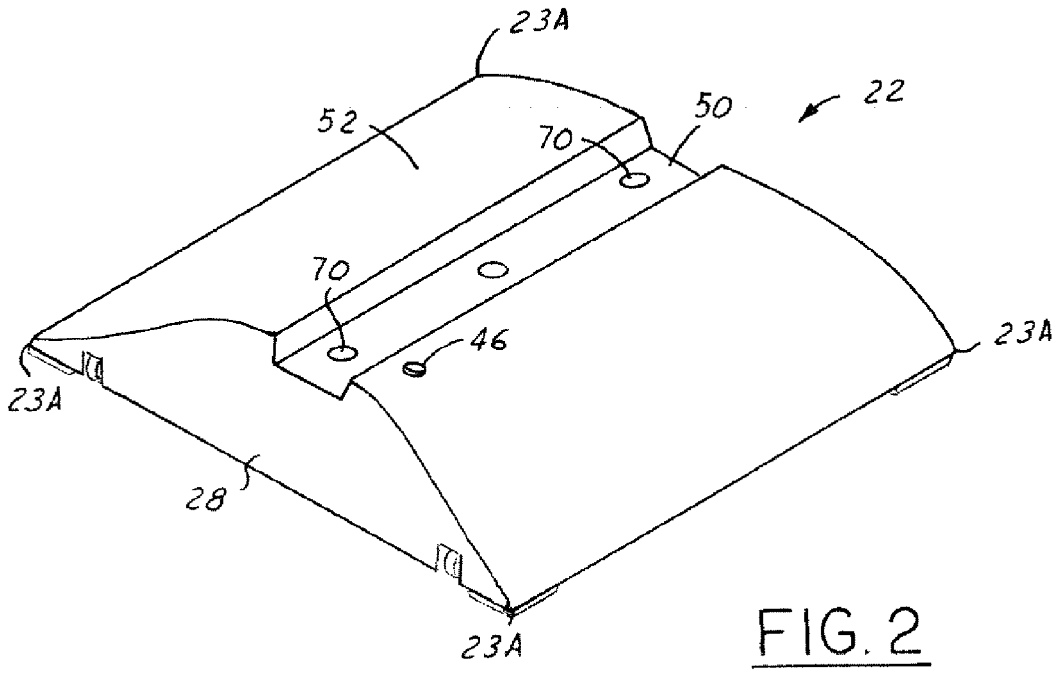
FIG. 2 is a perspective view of an inventive base member used with the embodiment illustrated in FIG. 1.
Figure 8:
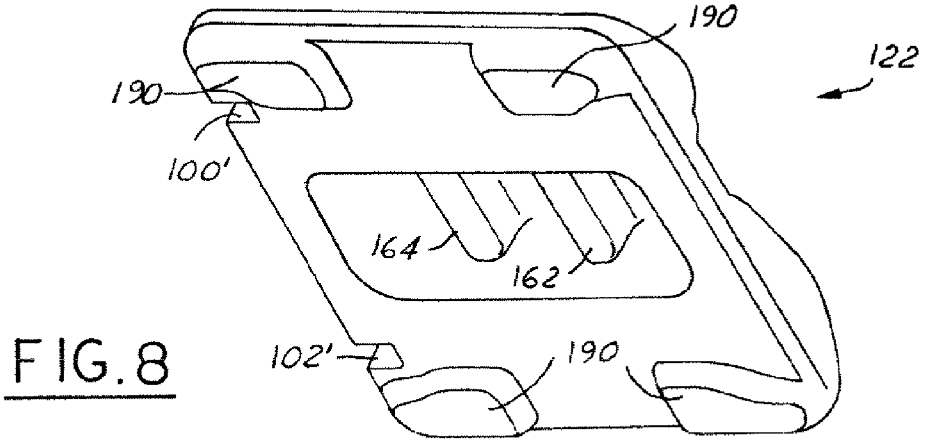
FIG. 8 is a perspective view of another embodiment of a base member for use with the present invention.
Figure 9:
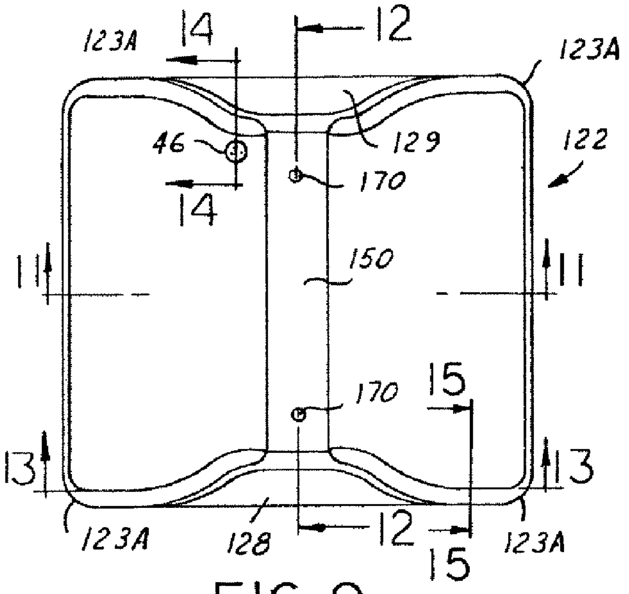
FIGS. 9 and 10 depict top and bottom elevational views, respectively, of the base member embodiment shown in FIG. 8.
Figure 10:
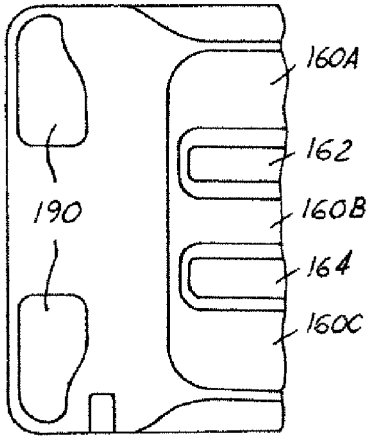
Figure 11:
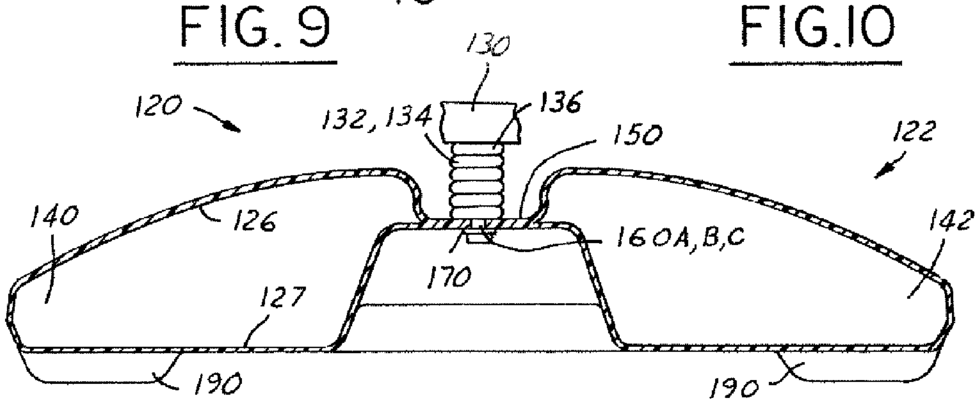
FIGS. 11, 12, 13, 14 and 15 are cross-sectional views taken along lines 11-11, 12-12, 13-13, 14-14 and 15-15, respectively, of the base member shown in FIG. 9.
Figure 12:
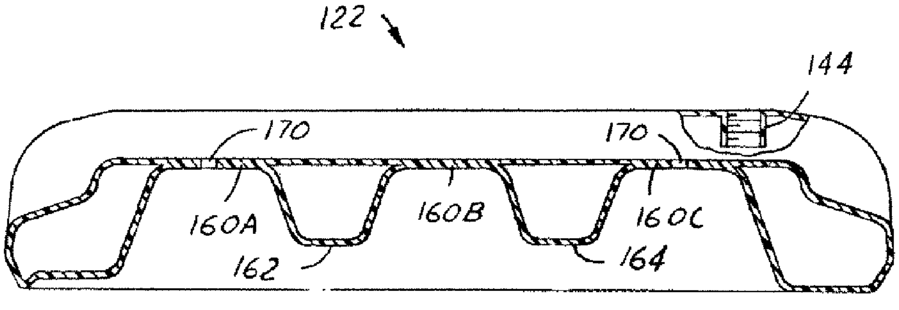
Figure 13:
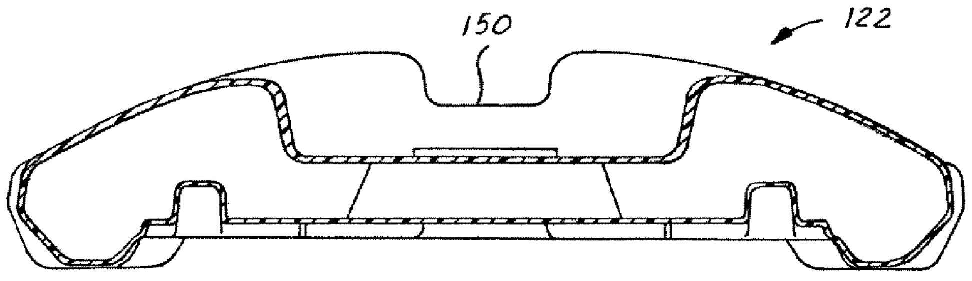
Figure 14:
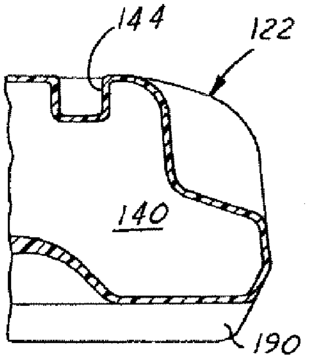

The precise exterior appearance or configuration of the base member 22 is not critical and can be changed according to the designer or user, so long as the objects and purposes of the present invention are maintained. The base member can have a square or rectangular shape as shown in the drawings, or can have a circular, hexagonal, triangular, etc. shape. In this regard, FIGS. 2 and 8 show two preferred relatively square shapes and configurations 22 and 122, respectively. The base member 22 can also have relative square-shaped outer corners 23A as shown in FIG. 2, or rounded outer corners 123A as shown in FIG. 8.

A recessed groove or channel 50 is provided on the upper surface 52 of the base member. The bottom of the sign display member 30 or spring members 32, 34 are positioned in the channel 50 which lowers the center of mass of the sign stand and provides increased stability. The recessed groove or channel also helps add structural stability and integrity to the base member. The channel 50 is preferably open or unobstructed at one or both ends for drainage of water, snow, or the like, and to prevent accumulation of leaves, trash and other debris. It is understood, of course, that a groove or channel is not critical or necessary to the present invention and that the sign display member and/or resilient mechanism can be simply connected or positioned to the top surface 52 of the base member.

The base member 22 has an upper wall member 26, a lower wall member 27, and at least two side wall members 28, 29. And, as indicated earlier, the base member is hollow having one or more internal hollow chambers or cavities 40, 42. When the base member 22 is formed, the upper wall member and lower wall member are merged together at one or more locations, forming an area of increased thickness 60. In this regard, in the embodiment shown in FIGS. 2-7, the upper and lower wall members are fabricated or joined together at one location 60 which coincides with groove or recessed channel 50. In the embodiment shown in FIGS. 8-13, the upper and lower wall members are fabricated or joined together at locations 160A, 160B and 160C in groove or recessed channel 150.

Figure 3:
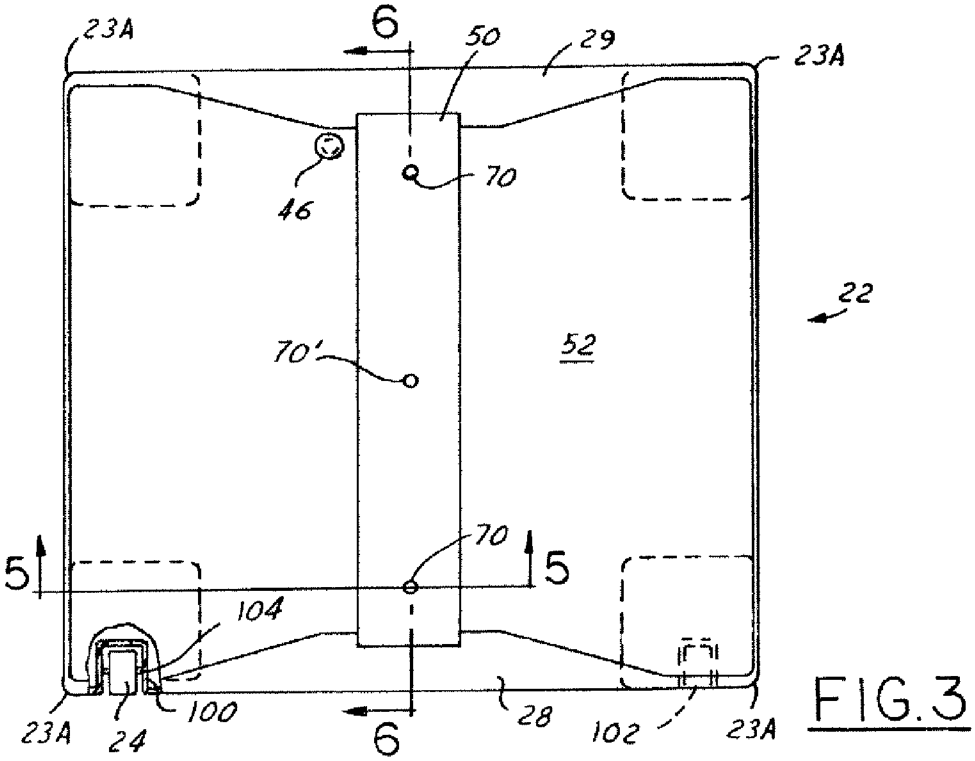
FIGS. 3 and 4 depict top and side elevational views, respectively, of the base member shown in FIG. 2.
Figure 4:
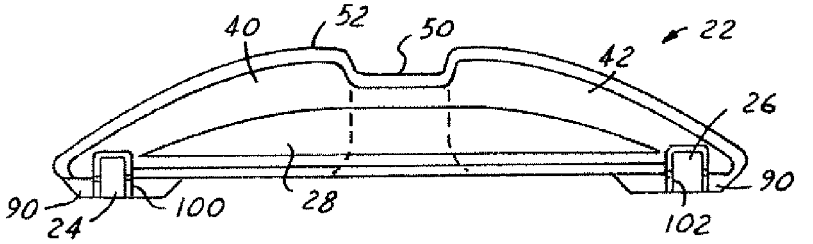

The areas 60, 160 A-C provide increased strength for the base member where the sign display members and/or resilient mechanisms are positioned. In order to attach or connect the resilient members to the base members, holes or openings 70, 170 are formed in the areas 60, 160 A-C. The holes or openings can be formed in any manner, such as by drilling. If two spring members or mechanisms are utilized, the two holes 70 in base 22 in FIG. 3 are utilized. Hole 70' is provided or utilized for a third spring member or mechanism if needed or desired - particularly with large sign displays.

Figure 5:
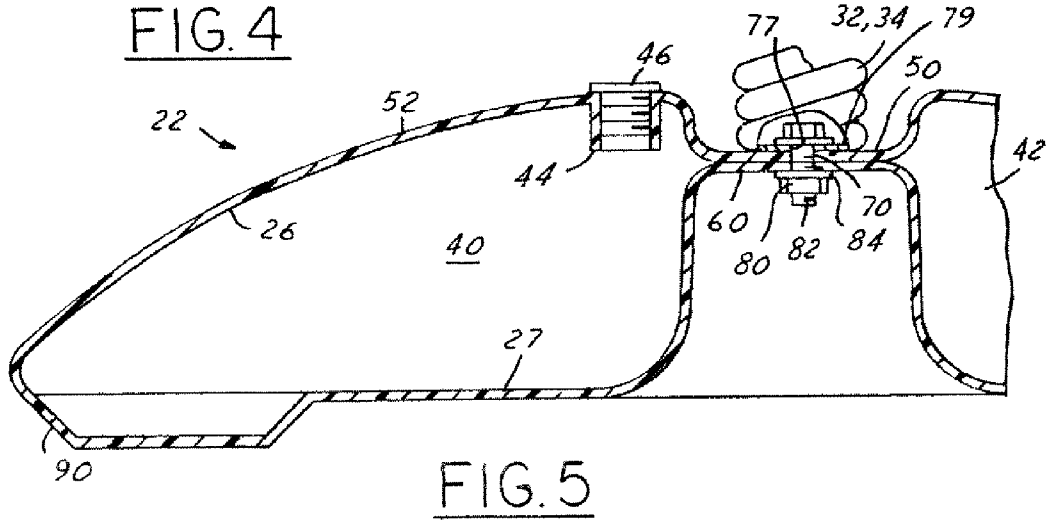
FIGS. 5 AND 6 are cross-sectional views taken along lines 5-5 and 6-6 in FIG. 3 and in the direction of the arrows.
Figure 6:
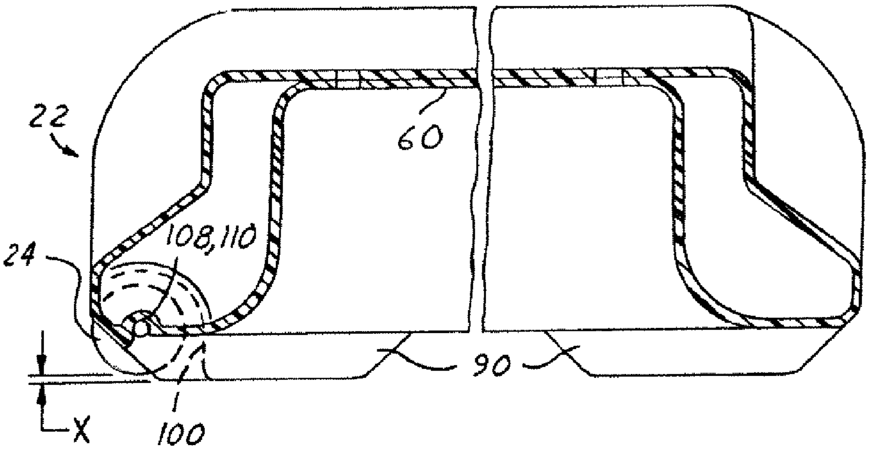

The spring members 32, 34 can be connected to the base member 22 with any conventional fastening mechanism, such as bolt and nut fasteners 80, 82 (as shown in FIG. 5). One or more washer members 84, which can be any conventional type of washer (flat washer, lock washer, spring washer, or the like) can also be provided. The bolt 82 is positioned through opening 77 in the lower end of spring member 32, 34.

With the present invention, it is not necessary to provide or place bracket members (not shown) on the upper or lower surfaces of the base member in order to connect the sign display members and/or resilient mechanism to the base member. The increased thickness of plastic material in the areas 60, 160A, B, C obviate the need for metal brackets or other additional structural members to prevent cracking, fatigue or failure of the base member at or adjacent the connection points of the spring mechanisms. It is also unnecessary to provide additional brackets or structural members in order to securely attach the wheel members to the base member, as pointed out below. The elimination of additional brackets or structural members reduces the total cost of the sign stand device and reduces the time to manufacture and assemble the final product.

A plurality of feet or pods 90 are provided on the bottom side of the base member 22. Preferably four feet 90 are provided for improved stability. The feet eliminate or minimize wobble or instability which might occur with a flat bottom base member. The precise member, location, size and shape of the feet members or pods for any particular base member is within the skill of persons in the art and can be dependent on the shape and configuration of the base member itself. With the embodiment of the base members 22, 122 shown and described herein, however, four feet or pod members 90 are preferably provided.

For portability of the sign stand device, i.e. the ability to easily move it from location to location, wheel members 24, 26 are provided in recesses 100 and 102 respectively on the base member 22. Preferably two wheel members are provided although any number can be provided within the scope and purpose of the present invention. The wheel members are provided along one side or edge of the base member so the entire sign display device can be tipped and rolled to a new location. When the wheel members are positioned on the base member, a slight clearance "X" (FIG. 6) is preferably provided between the bottom of the feet or pod members and the lower edges of the wheel members.

Figure 7:
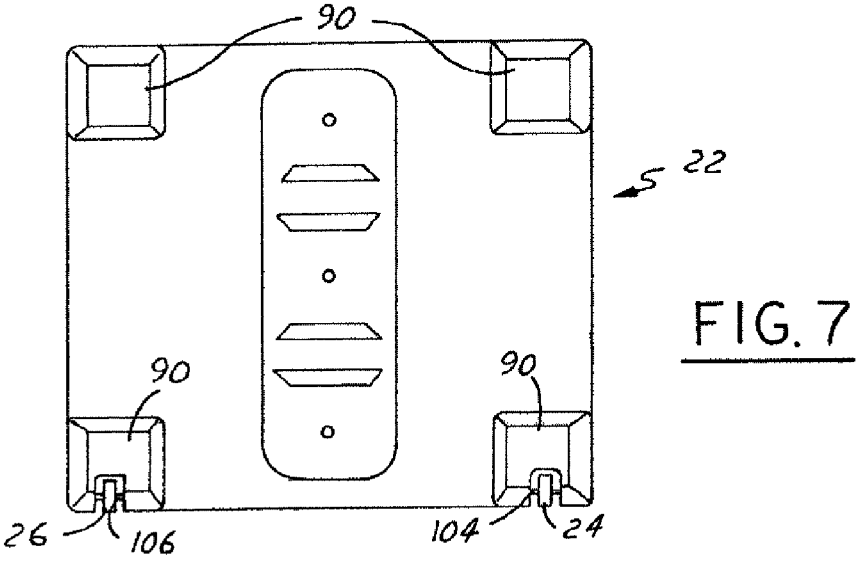
FIG. 7 is a bottom elevational view of the base member shown in FIG. 2.
Figure 15:
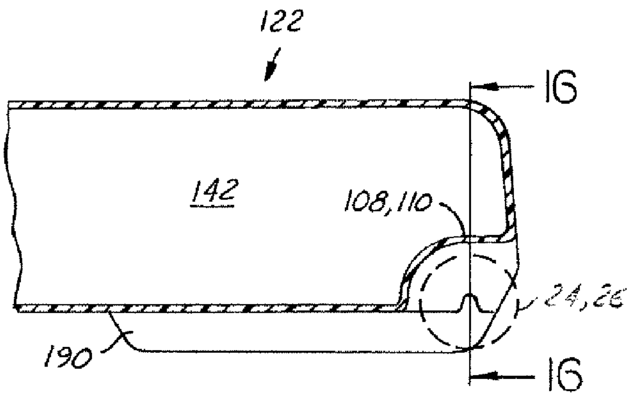
Figure 16:
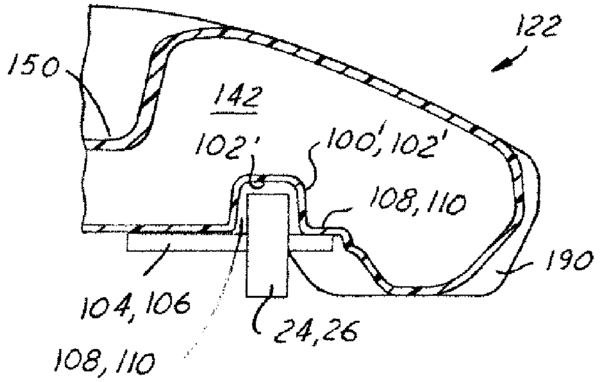
FIG. 16 is a cross-sectional view taken along lines 16-16 in FIG. 15.

The wheel members 24, 26 can be provided on a single axle or on separate axle members 104, 106 as shown in FIGS. 3 and 7. The axle members snap into mating recesses or grooves 108, 110 in the base member and are held in place in that manner (as better shown in FIGS. 15, 16). It is not necessary to drill holes in the base member in order to hold or secure the wheels and axles in place.

Also, the term "wheel member" is intended to include any type of roller member which can be used to assist in allowing a device to be moved relative to a surface.

As indicated, the wheels are positioned on one side of the base member and used to accommodate tipping of the sign stand device so it can be moved to other positions. The sign stand could be moved, for example, indoor for security or from one position to another merely for convenience. In order to allow the sign stand device to be moved, the sign stand device is tipped slightly so that the wheel members are fully engaged with the ground surface. In this position, the sign stand can be moved in any direction.

The corners of the base member can also be angled in order to provide additional clearance for the base member to be tipped for movement. It is only necessary in this regard to angle the two corner members adjacent the wheels, although for aesthetic reasons and uniformity it may be desired to also angle the other corners of the base member.

Preferably, accordance with the present invention, the hollow portions or chambers in the base member hold between five and ten gallons of liquid material or ballast. The weight of the material in containers or chambers of that size is believed to provide satisfactory stability in windy conditions for the sign stand.

A base member of the type shown in the drawings also has one or more large or flat surfaces which can be used for advertising members or messages. The advertisements could be decals, inserts, embossing, or the like.

An alternate embodiment of the present invention is shown in FIGS. 8-13. The sign stand device 120 has a base member 122 and a sign display member 130. Similar to the sign stand device and sign display member described above, the sign display member 130 can be attached to the base member 122 in any conventional manner such as with coil springs 136. The sign display member also can be a rigid or roll-up sign, both of which are commonly known and utilized in the sign stand and display field.

The structure and purposes of the base member 122 are similar to those described above with respect to base member 22. The primary differences is that the base member 122 has three separate areas 160A, 160B and 160C where the upper and lower wall members are united. The areas 160A, B, C are separated by rib members 162, 164. This embodiment provides a base member which is slightly stiffer and stronger. The roller or wheel members are also positioned at a different location on the base member.

As shown in FIGS. 8-13, the base member has a lower wall member 122, an upper wall member 126, two side members 128, 129, hollow cavities or chambers 140, 142, and a plurality of feet of pod members 190. Recesses or cavities 100, and 102, are provided for positioning of wheel members. Axles on the wheel members are snap fitted into channels 108, 110 in order to hold the wheels in place on the base members. Holes 170 are drilled or otherwise formed in the areas 160A and 160C, as well as area 160B in some embodiments for use in connecting a sign display member 130 directly or through one or more resilient spring members 136. A recessed hole 144 is provided on the upper wall surface for a threaded plug member (not shown) in order to form a port for the sand, water or other ballast materials.

A handle member (not shown) can be provided at one side of the base member, preferably opposite the wheel members. The handle member can be used to manually lift, tilt, or move the base member and sign stand device for adding ballast, removing or emptying the ballast, or simply transporting the sign stand from one position to another.

While the best modes for carrying out the invention have been described in detail, those familiar with the art to which this invention relates will recognize various alternative designs and embodiments for practicing the invention as defined by the following claims.

What is claimed is:

1. A method of making a sign stand assembly, said method comprising the steps of:

(a) providing a base member using a blow molding process, said base member having at least one hollow compartment therein for placement of a ballast substance therein;

said base member having an upper surface and a lower surface connected together at their outer edges to form said at least one hollow compartment;

said upper surface and said lower surfaces being joined together at least at one area separate from said outer edges to form a planar multi-layer supporting portion for placement of at least one resilient member;

said lower surface of said base member having a plurality of feet members thereon for supporting said sign stand assembly on a surface; and a plurality of wheel members attached to said lower surface for allowing said base member to be selectively moved from one position to another;

(b) connecting at least one resilient members to a sign member; and (c) connecting said at least one resilient member to said base member; said at least one resilient member being connected to said base member at said multi-layer supporting portion.

2. The method of making a sign stand assembly as described in claim 1 wherein two of said multi-layer supporting portions are provided on said base member separate from said outer edges, and at least one resilient member is connected to said base member at each of said two multi-layer supporting portions.

3. The method of making a sign stand assembly as described in claim 1 further comprising attaching said wheel members to said lower surface with axle members.

4. The method as described in claim 1 wherein said base member has a plurality of hollow components therein for placement of a ballast substance therein.

5. The method as described in claim 1 wherein a pair of resilient members are connected to said sign member and to said base member.

6. The method as described in claim 1 further comprising an access port for filling said at least one hollow component with a ballast substance.

7. A method of making a sign stand assembly, said method comprising the steps of:

(a) providing a base member using a blow molding process, said base member having at least one hollow compartment therein for placement of a ballast substance therein;

said base member having an upper surface and a lower surface connected together at their outer edges to form said at least one hollow compartment;

said upper surface and said lower surfaces being joined together at least at one area separate from said outer edges to form a joint horizontal planar supporting portion for placement of at least one resilient member;

said lower surface of said base member having a plurality of feet members thereon for supporting said sign stand assembly on a surface; and at least one rotational member attached to said lower surface for allowing said base member to be selectively moved from one position to another;

(b) connecting at least one resilient members to a sign member; and (c) connecting said at least one resilient member to said base member; said at least one resilient member being connected to said base member at said joint horizontal planar supporting portion.

* * * * *